(12) United States Patent
Zhang et al.

(10) Patent No.: US 12,392,594 B2
(45) Date of Patent: Aug. 19, 2025

(54) EFFICIENT AND ENERGY-SAVING BLASTING METHOD BASED ON NOTCHED BLAST HOLE

(71) Applicant: Chongqing Jiaotong University, Chongqing (CN)

(72) Inventors: Xuefu Zhang, Chongqing (CN); Bo Hu, Chongqing (CN); Jian Zhang, Chongqing (CN); Bo Chu, Chongqing (CN); Chunlong Wang, Chongqing (CN); Peiheng Guo, Chongqing (CN); Qiusheng Deng, Chongqing (CN)

(73) Assignee: Chongqing Jiaotong University, Chongqing (CN)

( * ) Notice: Subject to any disclaimer, the term of this patent is extended or adjusted under 35 U.S.C. 154(b) by 242 days.

(21) Appl. No.: 18/221,411

(22) Filed: Jul. 13, 2023

(65) Prior Publication Data
US 2024/0060761 A1 Feb. 22, 2024

(30) Foreign Application Priority Data
Aug. 20, 2022 (CN) .......................... 202211001967.2

(51) Int. Cl.
*F42D 1/08* (2006.01)
*F42D 3/04* (2006.01)

(52) U.S. Cl.
CPC ................ *F42D 3/04* (2013.01); *F42D 1/08* (2013.01)

(58) Field of Classification Search
CPC ... F42D 3/04; F42D 1/055; F42D 1/08; F42D 1/00; E21B 7/025; E21D 9/006; G06F 30/20; G06F 30/00

USPC ................ 102/312, 301, 313; 175/2, 24, 57, 175/4.55–4.59; 702/11; 89/1.15
See application file for complete search history.

(56) References Cited

U.S. PATENT DOCUMENTS

| | | | |
|---|---|---|---|
| 4,175,490 A * | 11/1979 | Britton | F42D 1/00 299/13 |
| 4,754,705 A * | 7/1988 | Worsey | E21B 33/1295 102/331 |
| 5,105,743 A * | 4/1992 | Tano | F42D 1/10 299/13 |
| 5,247,886 A * | 9/1993 | Worsey | F42D 1/18 102/312 |
| 6,035,784 A * | 3/2000 | Watson | F42D 1/00 299/13 |

(Continued)

*Primary Examiner* — Michael D David
(74) *Attorney, Agent, or Firm* — Bayramoglu Law Ofices L.L.C

(57) ABSTRACT

An efficient and energy-saving blasting method based on a notched blast hole includes forming a cutting hole, an auxiliary hole, and a peripheral hole on a surface of an area to be blasted separately by means of a drilling apparatus. The cutting hole, the auxiliary hole, and the peripheral hole are formed on the surface of the blasting area separately, and notches with different numbers are formed on outer sides of the holes separately, such that in a blasting process, explosion energy of explosives can be transmitted along the notches, the explosion energy is guided, energy loss is reduced, blasting efficiency is improved, thus a range of a crushing area is reduced, a length of a main crack is increased, and a better blasting effect is achieved. Moreover, explosive energy is concentrated on the notch to initiate crack, so as to reduce an explosion smash area.

8 Claims, 5 Drawing Sheets

(56) References Cited

U.S. PATENT DOCUMENTS

| | | | | |
|---|---|---|---|---|
| 6,339,992 B1* | 1/2002 | Watson | ............ | E21C 37/12 |
| | | | | 102/302 |
| 7,500,528 B2* | 3/2009 | McKinzie, II | ....... | E21B 36/04 |
| | | | | 166/57 |
| 2008/0230477 A1* | 9/2008 | Mihaylov | .......... | F42D 3/00 |
| | | | | 210/652 |
| 2013/0125772 A1* | 5/2013 | Backhus | ............ | F42D 5/00 |
| | | | | 102/206 |

* cited by examiner

```
┌─────────────────────────────────────────────────────────────┐
│ Form a cutting hole, an auxiliary hole and a peripheral hole│
│ on a surface of an area to be blasted separately by means of│
│ a drilling apparatus                                        │
└─────────────────────────────────────────────────────────────┘
                              │
                              ▼
┌─────────────────────────────────────────────────────────────┐
│ Form a notch on an outer side of the cutting hole by means  │
│ of a notching apparatus                                     │
└─────────────────────────────────────────────────────────────┘
                              │
                              ▼
┌─────────────────────────────────────────────────────────────┐
│ Form a notch on an outer side of the auxiliary hole by      │
│ means of the notching apparatus                             │
└─────────────────────────────────────────────────────────────┘
                              │
                              ▼
┌─────────────────────────────────────────────────────────────┐
│ Form a notch on an outer side of the peripheral hole by     │
│ means of the notching apparatus                             │
└─────────────────────────────────────────────────────────────┘
                              │
                              ▼
┌─────────────────────────────────────────────────────────────┐
│ Fill the cutting hole with blasting explosive for blasting  │
└─────────────────────────────────────────────────────────────┘
```

FIG. 1

EFFICIENT AND ENERGY-SAVING BLASTING METHOD BASED ON NOTCHED BLAST HOLE

CROSS-REFERENCE TO THE RELATED APPLICATION

This application is based upon and claims priority to Chinese Patent Application No. 202211001967.2 filed on Aug. 20, 2022, the entire content of which is incorporated herein by reference.

TECHNICAL FIELD

The present invention relates to a technical field of blasting methods, and particularly relates to an efficient and energy-saving blasting method based on a notched blast hole.

BACKGROUND

During highway project construction and tunnel construction, a tunnel often needs to be opened through blasting excavation. An existing tunnel blasting excavation technology, which may produce over-excavation and under-excavation when used, often involves drilling round holes directly in a blasting area and then filling them with explosives for blasting. Such a blasting method often consumes a lot of explosives, detonators, etc., with high economic costs. As for conventional round hole blasting, during explosion of explosives, energy spreads evenly around, an explosion smash area is larger, blasting broken stones are more crushed, and distribution of explosion energy cannot be controlled, so a blasting effect is poor, and it is difficult to achieve a better use effect.

SUMMARY

An objective of the present invention is to solve defects in the prior art, and an efficient and energy-saving blasting method based on a notched blast hole is provided.

In order to achieve the above objective, the present invention uses the following technical solution: an efficient and energy-saving blasting method based on a notched blast hole includes:

S1: forming a cutting hole, an auxiliary hole and a peripheral hole on a surface of an area to be blasted separately by means of a drilling apparatus;

S2: forming a notch on an outer side of the cutting hole by means of a notching apparatus, where a notching mode uses four-direction notches;

S3: forming a notch on an outer side of the auxiliary hole by means of the notching apparatus, where a notching mode uses three-direction notches;

S4: forming a notch on an outer side of the peripheral hole by means of the notching apparatus, where a notching mode uses two-direction notches; and S5: filling the cutting hole with blasting explosive for blasting.

In order to disperse blasting, improvement of the present invention is that the cutting hole in S1 is formed at a center position of a surface of a blasting area.

In order to guide explosion energy, improvement of the present invention is that the auxiliary hole in S1 is formed at a position of the surface of the blasting area above the cutting hole.

In order to control a blasting range, improvement of the present invention is that the peripheral hole in S1 is formed at an edge position of the surface of the blasting area.

In order to achieve a better blasting effect, improvement of the present invention is that the cutting hole in S2 uses four-direction notches, the notches in all directions are spaced by 90°, a transverse notch direction is parallel to a horizontal direction, and the notches are uniformly arranged on two sides of the blasting area.

In order to guide the explosion energy to the peripheral hole, improvement of the present invention is that the auxiliary hole in S3 uses three-direction notches, the notches in all directions are spaced by 120°, the auxiliary holes are uniformly distributed along a contour line of the blasting area, and tips of the notches point to the peripheral hole.

In order to control a blasting range, improvement of the present invention is that the peripheral hole in S4 uses two-direction notches, the two notches are spaced by 180°, tips of the notches are connected end to end, and a connecting line forms a contour line of the blasting area.

In order to achieve a better energy guide effect, improvement of the present invention is that in S2-S4, the formed notches have a depth of 1 cm-1.2 cm and an angle of 45°-60°.

Compared with the prior art, the present invention has the following advantages and positive effects.

In the present invention, the cutting hole, the auxiliary hole and the peripheral hole are formed on the surface of the blasting area separately, and notches with different numbers are formed on outer sides of the holes separately, such that in a blasting process, explosion energy of explosives can be transmitted along the notches, the explosion energy is guided, energy loss is reduced, blasting efficiency is improved, thus a range of a crushing area is reduced, a length of a main crack is increased, and a better blasting effect is achieved. The number of the cutting hole and the peripheral hole can be effectively reduced, moreover, explosive energy is concentrated on the notch, to initiate crack, so as to reduce an explosion smash area, improve the blasting efficiency, and reduce explosive consumption, the economic cost is saved and a better use effect is achieved.

BRIEF DESCRIPTION OF THE DRAWINGS

FIG. 1 is a flowchart of an efficient and energy-saving blasting method based on a notched blast hole according to the present invention;

DETAILED DESCRIPTION OF THE EMBODIMENTS

Figure 2:
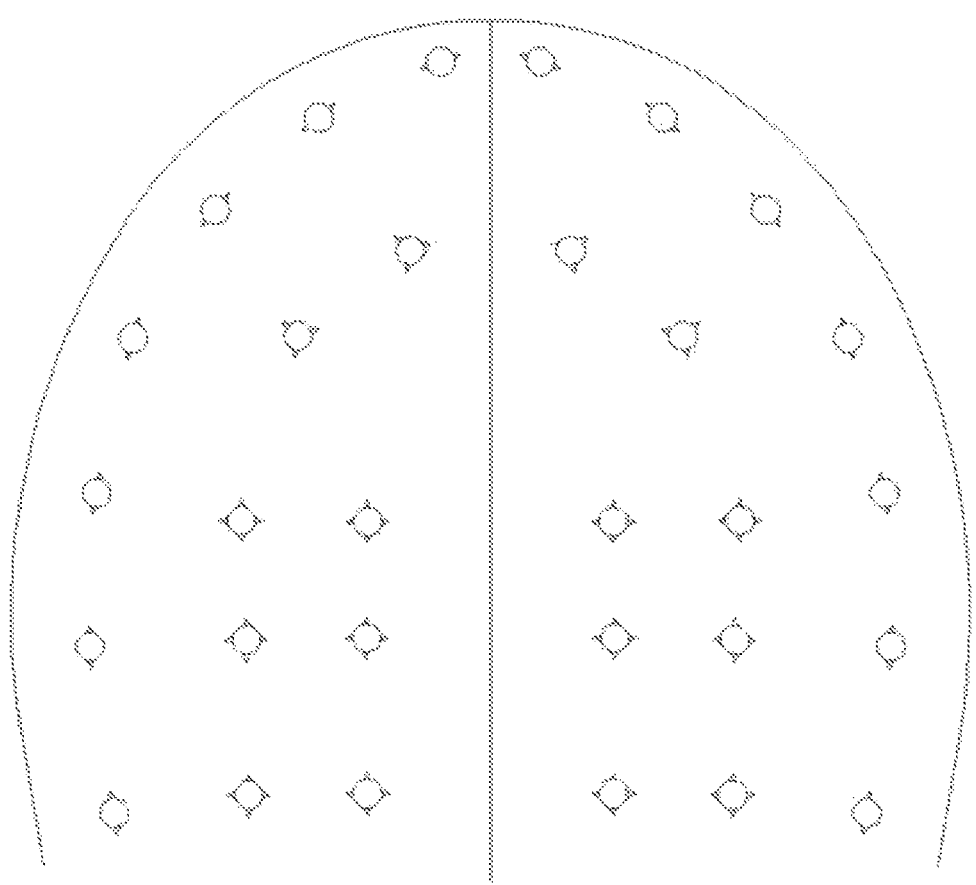
FIG. 2 is a schematic diagram of entire hole opening on a blasting area through an efficient and energy-saving blasting method based on a notched blast hole according to the present invention.

In order to more clearly understand the above objectives, features, and advantages of the present invention, the present invention will be further elaborated below in conjunction with the accompanying drawings and the embodiments. It is to be noted that the embodiments in the present application and features in the embodiments can be combined without conflicts.

In the description of the present invention, it is to be understood that the terms "length", "width", "upper", "lower", "front", "back", "left", "right", "vertical", "horizontal", "top", "bottom", "inner", "outer", etc. indicate azimuthal or positional relations based on those shown in the drawings only for ease of description of the present invention and for simplicity of description, and are not intended to indicate or imply that the referenced device or element must have a particular orientation and be constructed and operative in a particular orientation, and thus may not be construed as a limitation on the present invention. Moreover, in the description of the present invention, "plurality" means two or more, unless expressly specified otherwise.

EMBODIMENT

Figure 3:
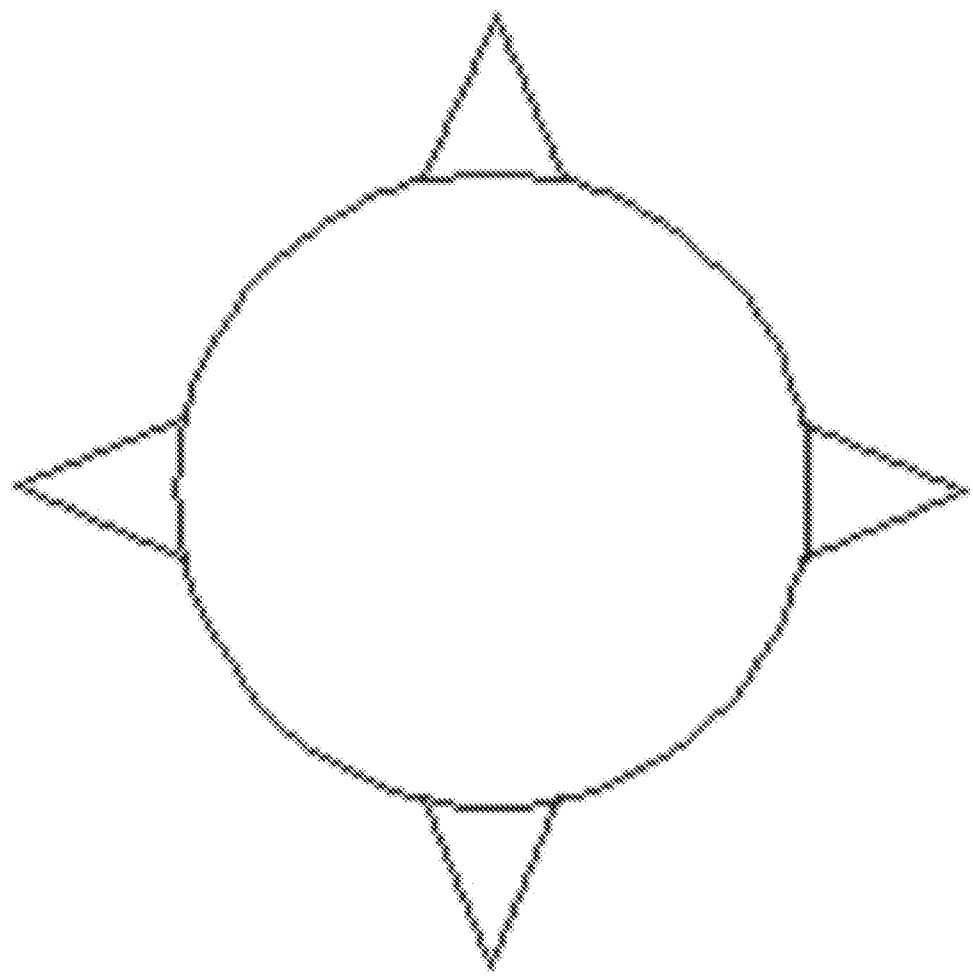
FIG. 3 is a schematic diagram of a cutting hole in an efficient and energy-saving blasting method based on a notched blast hole according to the present invention.
Figure 4:
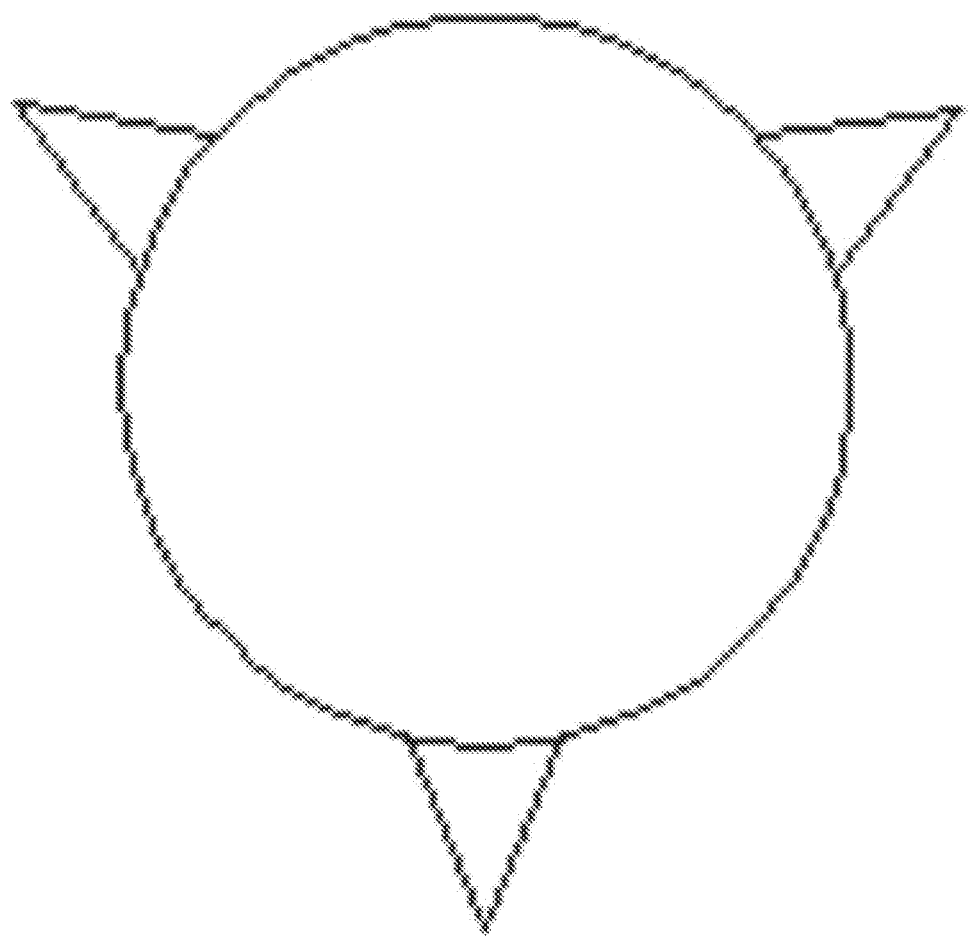
FIG. 4 is a schematic diagram of an auxiliary hole in an efficient and energy-saving blasting method based on a notched blast hole according to the present invention.
Figure 5:
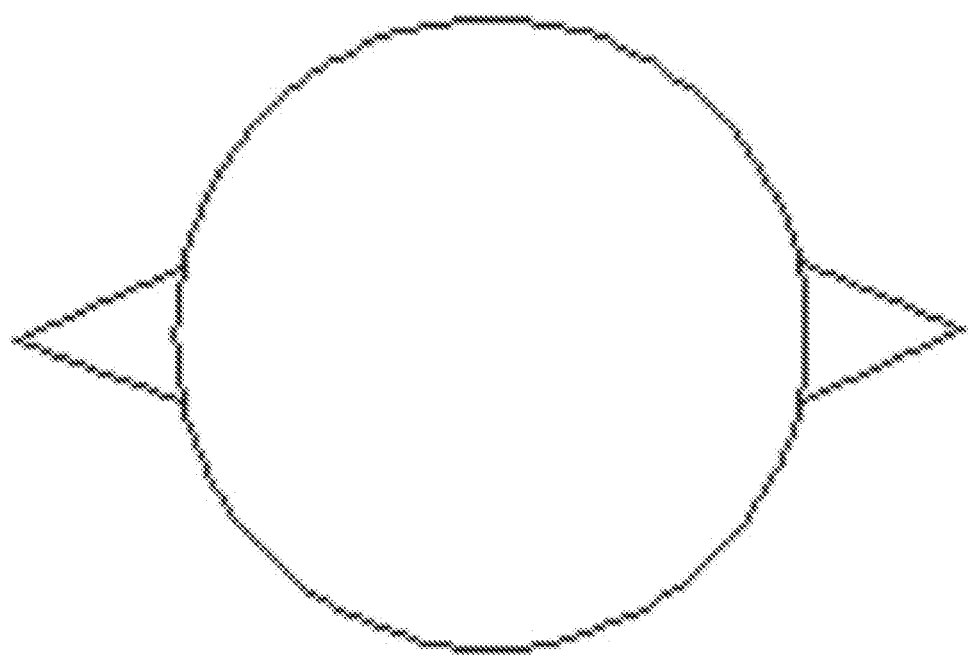
FIG. 5 is a schematic diagram of a peripheral hole in an efficient and energy-saving blasting method based on a notched blast hole according to the present invention.

As shown in FIGS. 1-5, the present invention provides a technical solution: an efficient and energy-saving blasting method based on a notched blast hole includes:
S1: form a cutting hole, an auxiliary hole and a peripheral hole on a surface of an area to be blasted separately by means of a drilling apparatus;
S2: form a notch on an outer side of the cutting hole by means of a notching apparatus, where a notching mode uses four-direction notches;
S3: form a notch on an outer side of the auxiliary hole by means of the notching apparatus, where a notching mode uses three-direction notches;
S4: form a notch on an outer side of the peripheral hole by means of the notching apparatus, where a notching mode uses two-direction notches; and
S5: fill the cutting hole with blasting explosive for blasting.

As shown in FIGS. 2-5, the cutting hole in S1 is formed at a center position of a surface of a blasting area, the auxiliary hole in S1 is formed at a position of the surface of the blasting area above the cutting hole, the peripheral hole in S1 is formed at an edge position of the surface of the blasting area. The cutting hole in S2 uses four-direction notches, the notches in all directions are spaced by 90°, a transverse notch direction is parallel to a horizontal direction, and the notches are uniformly arranged on two sides of the blasting area, such that the blasting energy can make the blasting area uniformly fracture along the cutting hole and the four-direction notches. The auxiliary hole in S3 uses three-direction notches, the notches in all directions are spaced by 120°, the auxiliary holes are uniformly distributed along a contour line of the blasting area, and tips of the notches point to the peripheral hole, such that the blasting energy can be transmitted to the peripheral hole through the auxiliary hole and the three-direction notches. The peripheral hole in S4 uses two-direction notches, the two notches are spaced by 180°, tips of the notches are connected end to end, and a connecting line forms a contour line of the blasting area, such that the blasting energy can be transmitted along the peripheral hole and the two-direction notches, to form the blasting area. In S2-S4, the notch depth is 1 cm-1.2 cm, a too deep notch depth causes low efficiency, and a too shallow depth makes a guiding effect not obvious; and the notch angle is 45°-60°, to achieve a better blasting guide effect.

A working principle: the cutting hole, the auxiliary hole and the peripheral hole are formed on the surface of the blasting area separately, and notches with different numbers are formed on outer sides of the holes separately, such that in a blasting process, explosion energy of explosives can be transmitted along the notches, the explosion energy is guided, energy loss is reduced, blasting efficiency is improved, thus a range of a crushing area is reduced, a length of a main crack is increased, and a better blasting effect is achieved. The number of the cutting hole and the peripheral hole can be effectively reduced, moreover, explosive energy is concentrated on the notch, to initiate crack, so as to reduce an explosion smash area, improve the blasting efficiency, and reduce explosive consumption, the economic cost is saved and a better use effect is achieved.

The foregoing are merely preferred embodiments of the present invention, and are not intended to limit the present invention in other forms. Those skilled in the art can make alterations or modifications by using the technical contents disclosed above, so as to arrive at equivalent embodiments with equivalent changes to be applied to other fields. However, any simple amendments, equivalent changes, and modifications made to the above embodiments according to the technical essence of the present invention without departing from the contents of the technical solutions of the present invention still fall within the scope of protection of the technical solutions of the present invention.

The invention claimed is:
1. An efficient and energy-saving blasting method based on a notched blast hole, comprising:
S1: forming a cutting hole, an auxiliary hole, and a peripheral hole on a surface of an area to be blasted separately by means of a drilling apparatus;
S2: forming a notch on an outer side of the cutting hole by means of a notching apparatus, wherein a notching mode uses four-direction notches;
S3: forming a notch on an outer side of the auxiliary hole by means of the notching apparatus, wherein a notching mode uses three-direction notches;
S4: forming a notch on an outer side of the peripheral hole by means of the notching apparatus, wherein a notching mode uses two-direction notches; and
S5: filling the cutting hole with blasting explosive for blasting.
2. The efficient and energy-saving blasting method based on the notched blast hole according to claim 1, wherein the cutting hole in S1 is formed at a center position of a surface of a blasting area.
3. The efficient and energy-saving blasting method based on the notched blast hole according to claim 1, wherein the auxiliary hole in S1 is formed at a position of the surface of the blasting area above the cutting hole.
4. The efficient and energy-saving blasting method based on the notched blast hole according to claim 1, wherein the peripheral hole in S1 is formed at an edge position of the surface of the blasting area.
5. The efficient and energy-saving blasting method based on the notched blast hole according to claim 1, wherein the cutting hole in S2 uses four-direction notches, the notches in all directions are spaced by 90°, a transverse notch direction is parallel to a horizontal direction, and the notches are uniformly arranged on two sides of the blasting area.
6. The efficient and energy-saving blasting method based on the notched blast hole according to claim 1, wherein the auxiliary hole in S3 uses three-direction notches, the notches in all directions are spaced by 120°, the auxiliary holes are uniformly distributed along a contour line of the blasting area, and tips of the notches point to the peripheral hole.

7. The efficient and energy-saving blasting method based on the notched blast hole according to claim 1, wherein the peripheral hole in S4 uses two-direction notches, the two notches are spaced by 180°, tips of the notches are connected end to end, and a connecting line forms a contour line of the blasting area.

8. The efficient and energy-saving blasting method based on the notched blast hole according to claim 1, wherein in S2-S4, the formed notches have a depth of 1 cm-1.2 cm and an angle of 45°-60°.

\* \* \* \* \*